United States Patent
Park et al.

(10) Patent No.: US 9,544,112 B2
(45) Date of Patent: Jan. 10, 2017

(54) METHOD BY WHICH TERMINAL TRANSMITS AND RECEIVES SIGNAL IN MULTI CELL-BASED WIRELESS COMMUNICATION SYSTEM, AND DEVICE FOR SAME

(71) Applicant: LG Electronics Inc., Seoul (KR)

(72) Inventors: Jonghyun Park, Seoul (KR); Byounghoon Kim, Seoul (KR); Kijun Kim, Seoul (KR); Eunsun Kim, Seoul (KR); Hanbyul Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/441,982

(22) PCT Filed: Mar. 19, 2014

(86) PCT No.: PCT/KR2014/002305
§ 371 (c)(1),
(2) Date: May 11, 2015

(87) PCT Pub. No.: WO2014/148812
PCT Pub. Date: Sep. 25, 2014

(65) Prior Publication Data
US 2015/0304082 A1 Oct. 22, 2015

Related U.S. Application Data

(60) Provisional application No. 61/803,434, filed on Mar. 19, 2013, provisional application No. 61/806,382, filed on Mar. 28, 2013.

(51) Int. Cl.
*H04W 88/02* (2009.01)
*H04W 52/18* (2009.01)
(Continued)

(52) U.S. Cl.
CPC .......... *H04L 5/0048* (2013.01); *H04W 72/085* (2013.01); *H04L 5/0023* (2013.01)

(58) Field of Classification Search
USPC .......................................... 370/329
See application file for complete search history.

(56) References Cited

U.S. PATENT DOCUMENTS

2013/0258964 A1* 10/2013 Nam .................. H04W 72/046
370/329
2013/0322376 A1* 12/2013 Marinier ............... H04W 72/06
370/329

(Continued)

FOREIGN PATENT DOCUMENTS

KR    1020100124677    11/2010
KR    102011005362     1/2011

(Continued)

*Primary Examiner* — Edan Orgad
*Assistant Examiner* — Sithu Ko
(74) *Attorney, Agent, or Firm* — Dentons US LLP

(57) ABSTRACT

Disclosed is a method by which a terminal transmits and receives a signal in a multi cell-based wireless communication system. Particularly, the method comprises the steps of: transmitting, to a serving cell, capability information in which the number of supportable channel status information (CSI) processes is set to zero; receiving, from the serving cell, information on a neighboring cell through an upper layer signal as a response to the capability information; receiving a cell-specific reference signal from the neighboring cell; reporting, to the serving cell, the CSI estimated on the basis of the cell-specific reference signal; and receiving, from the neighboring cell, a user equipment specific reference signal and a data channel on the basis of the CSI.

14 Claims, 11 Drawing Sheets

(51) Int. Cl.
*H04L 5/00* (2006.01)
*H04W 72/08* (2009.01)

(56) References Cited

U.S. PATENT DOCUMENTS

| | | | | |
|---|---|---|---|---|
| 2014/0016499 A1* | 1/2014 | Forenza | ................. | H04B 7/024 370/252 |
| 2014/0022988 A1* | 1/2014 | Davydov | ............... | H04B 7/024 370/328 |
| 2014/0086084 A1* | 3/2014 | Bi | ......................... | H04L 1/0026 370/252 |
| 2014/0133395 A1* | 5/2014 | Nam | .................... | H04B 7/0452 370/328 |
| 2014/0247796 A1* | 9/2014 | Ouchi | ................... | H04L 5/0053 370/329 |
| 2015/0207604 A1* | 7/2015 | Sun | ...................... | H04B 7/0626 370/329 |

FOREIGN PATENT DOCUMENTS

| | | |
|---|---|---|
| KR | 1020110049694 | 5/2011 |
| KR | 1020110101033 | 9/2011 |
| WO | 2013009127 | 1/2013 |

* cited by examiner

Control-Plane Protocol Stack

User-Plane Protocol Stack

▨ : DMRS GROUP 1

▩ : DMRS GROUP 2

METHOD BY WHICH TERMINAL TRANSMITS AND RECEIVES SIGNAL IN MULTI CELL-BASED WIRELESS COMMUNICATION SYSTEM, AND DEVICE FOR SAME

This application is a 35 USC §371 National Stage entry of International Application No. PCT/KR2014/002305 filed on Mar. 19, 2014, and claims priority to U.S. Provisional Application No. 61/803,434 filed on Mar. 19, 2013 and 61/806,382 filed on Mar. 28, 2013, all of which are hereby incorporated by reference in their entireties as if fully set forth herein.

TECHNICAL FIELD

The present invention relates to a wireless communication system and, more particularly, to a method for transmitting and receiving by a user equipment in a multi-cell based wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of UEs by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the UEs. For a downlink (hereinafter abbreviated DL) data, the eNode B informs a corresponding UE of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding UE of time/frequency region usable by the corresponding UE, coding, data size, HARQ-related information and the like by transmitting UL scheduling information to the corresponding UE. Interfaces for user-traffic transmission or control traffic transmission may be used between eNode Bs. A core network (CN) consists of an AG (access gateway) and a network node for user registration of a UE and the like. The AG manages a mobility of the UE by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power.

DISCLOSURE

Technical Problem

The present invention has been made in view of the above problems, and it is an object of the present invention to provide a method for transmitting and receiving a signal by a UE in a multi-cell based wireless communication system and an apparatus therefor.

Technical Solution

The object of the present invention can be achieved by providing a method for transmitting and receiving a signal by a user equipment in a multi-cell based wireless communication system, includes transmitting capability information in which the number of supportable channel state information (CSI) processes is set to 0 to a serving cell; receiving information about a neighboring cell through a higher layer signal from the serving cell as a response to the capability information; receiving a cell-specific reference signal from the neighboring cell; reporting CSI estimated based on the cell-specific reference signal to the serving cell; and receiving a user equipment specific reference signal and a data channel based on the CSI from the neighboring cell.

The receiving the user equipment specific reference signal and the data channel may include detecting the user equipment specific reference signal; and decoding the data channel using information estimated by the user equipment specific reference signal. The information about the neighboring cell may include cell identifier information of the neighboring cell. The user equipment specific reference signal may be detected using the cell identifier information of the neighboring cell.

The user equipment specific reference signal may be a user equipment specific reference signal assumed to have the same large-scale properties as the cell specific reference signal in the information about the neighboring cell. The large-scale properties may include at least one of Doppler spread, Doppler shift, average delay, and delay spread.

The CSI reported to the serving cell may be transferred to the neighboring cell. The information about the neighboring cell may include information about a cell specific reference signal of the neighboring cell.

In another aspect of the present invention, provided herein is a user equipment in a multi-cell based wireless communication system, including a wireless communication module for transmitting and receiving a signal to and from a network through multiple cells; and a process for processing the signal, wherein the processor controls the wireless communication module to transmit capability information in which the number of supportable channel state information (CSI) processes is set to 0 to a serving cell, receive information about a neighboring cell through a higher layer signal from the serving cell as a response to the capability information, receive a cell-specific reference signal from the neighboring cell, report CSI estimated based on the cell-specific reference signal to the serving cell, and receive a user equipment specific reference signal and a data channel based on the CSI from the neighboring cell.

Advantageous Effects

According to embodiments of the present invention, a UE can efficiently transmit and receive a signal in a multi-cell based wireless communication system.

Effects obtainable from the present invention may be non-limited by the above mentioned effect. And, other unmentioned effects can be clearly understood from the following description by those having ordinary skill in the technical field to which the present invention pertains.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
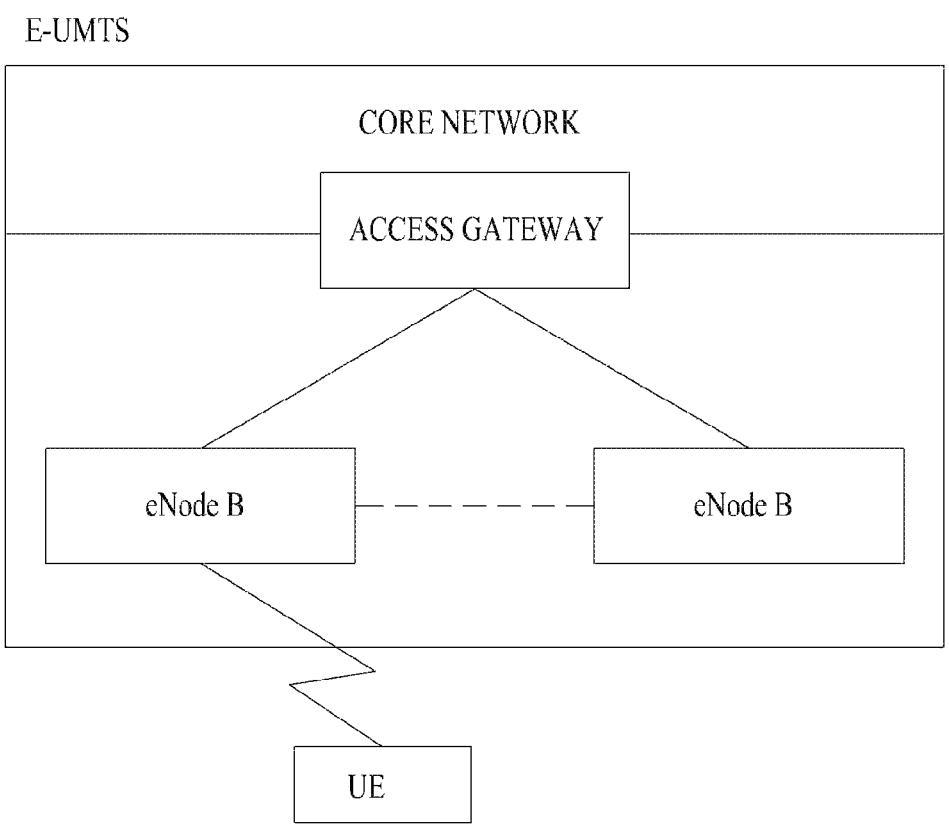
FIG. 1 is a schematic diagram of E-UMTS network structure as one example of a wireless communication system.
Figure 2A:
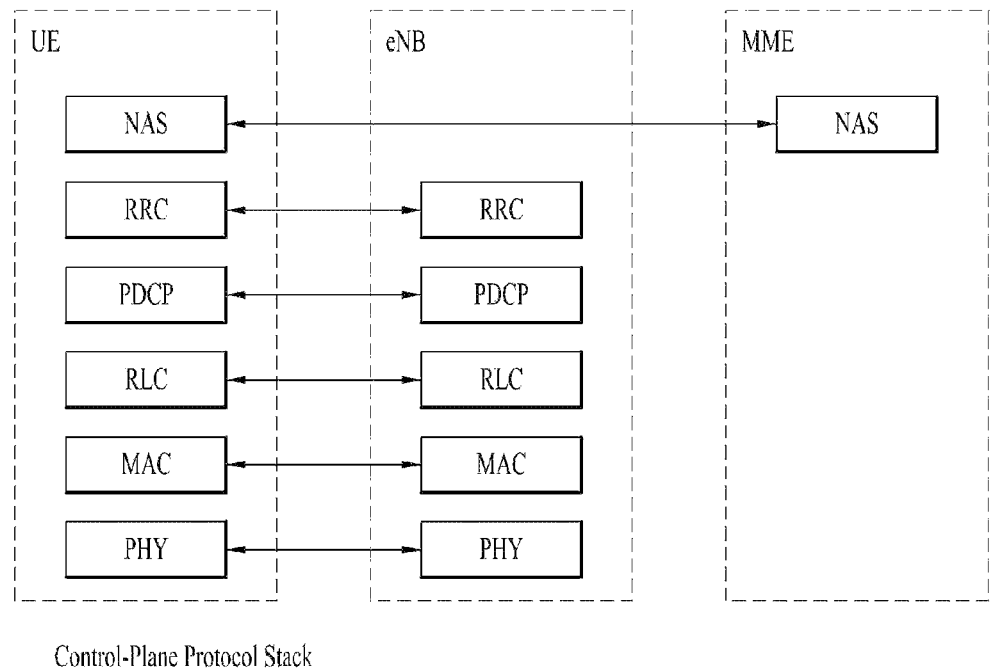
FIGS. 2(*a*) and 2(*b*) are diagrams for structures of control and user planes of radio interface protocol between a 3GPP radio access network standard-based user equipment and E-UTRAN.
Figure 2B:
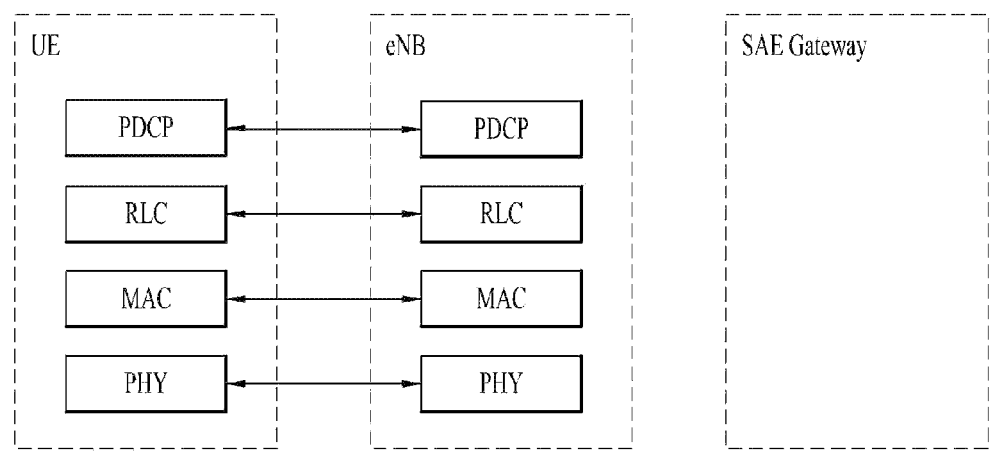

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the UE and the network. To this end, the RRC layer of the UE and the RRC layer of the network exchange a RRC message with each other. In case that there is an RRC connection (RRC connected) between the UE and the RRC layer of the network, the UE lies in the state of RRC connected (connected mode). Otherwise, the UE lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of UEs. Different cells can be configured to provide corresponding bandwidths, respectively.

DL transport channels for transmitting data from a network to a UE include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a UE to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
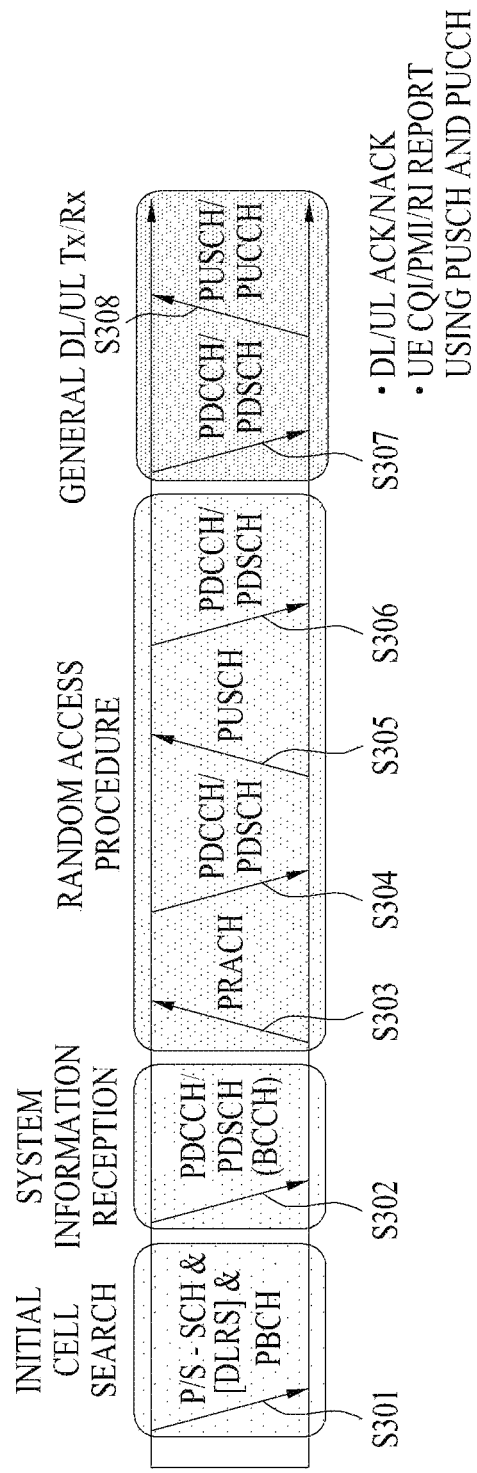
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a UE is turned on or the UE enters a new cell, the UE may perform an initial cell search job for matching synchronization with an eNode B and the like [S301]. To this end, the UE may receive a primary synchronization channel (P-SCH) and a secondary synchronization channel (S-SCH) from the eNode B, may be synchronized with the eNode B and may then obtain information such as a cell ID and the like. Subsequently, the UE may receive a physical broadcast channel from the eNode B and may be then able to obtain intra-cell broadcast information. Meanwhile, the UE may receive a downlink reference signal (DL RS) in the initial cell search step and may be then able to check a DL channel state.

Having completed the initial cell search, the UE may receive a physical downlink shared control channel (PDSCH) according to a physical downlink control channel (PDCCH) and an information carried on the physical downlink control channel (PDCCH). The UE may be then able to obtain a detailed system information [S302].

Meanwhile, if a UE initially accesses an eNode B or does not have a radio resource for transmitting a signal, the UE may be able to perform a random access procedure to complete the access to the eNode B [S303 to S306]. To this end, the UE may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the UE may be able to perform a PDCCH/PDSCH reception [S307] and a PUSCH/PUCCH (physical uplink shared channel/physical uplink control channel) transmission [S308] as a general uplink/downlink signal transmission procedure. In particular, the UE receives a DCI (downlink control information) on the PDCCH. In this case, the DCI contains such a control information as an information on resource allocation to the UE. The format of the DCI varies in accordance with its purpose.

Meanwhile, control information transmitted to an eNode B from a UE via UL or the control information received by the UE from the eNode B includes downlink/uplink ACK/NACK signals, CQI (Channel Quality Indicator), PMI (Precoding Matrix Index), RI (Rank Indicator) and the like. In case of 3GPP LTE system, the UE may be able to transmit the aforementioned control information such as CQI/PMI/RI and the like on PUSCH and/or PUCCH.

Figure 4:
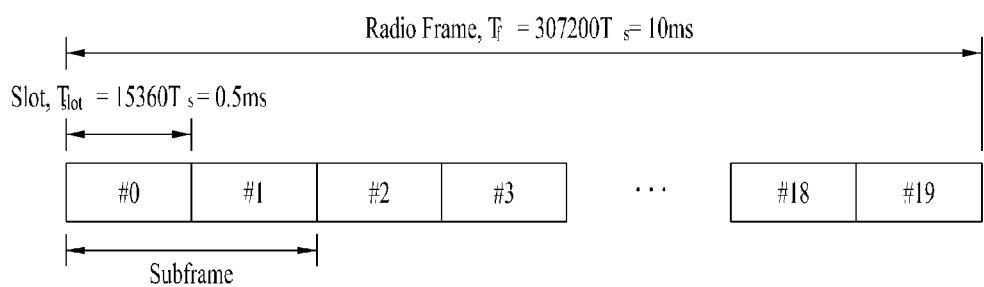
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15\ \text{kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
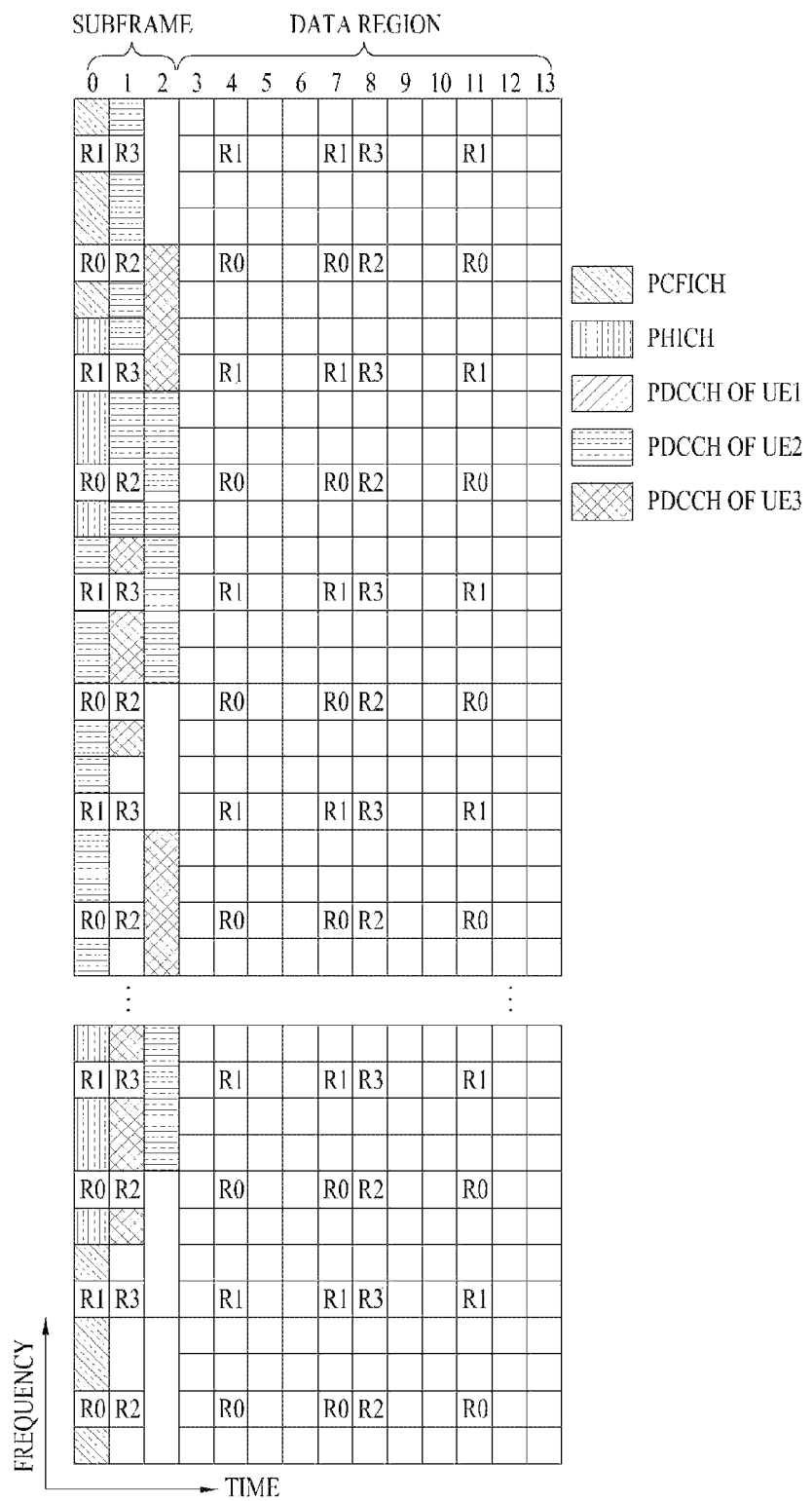
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a UE of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of UEs or a UE group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the UE transmit and receive data via the PDSCH in general except a specific control information or a specific service data.

Information on a UE (one or a plurality of UEs) receiving data of PDSCH, a method of receiving and decoding the PDSCH data performed by the UE, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the UE in a cell monitors the PDCCH using the RNTI information of its own, if there exist at least one or more UEs having the "A" RNTI, the UEs receive the PDCCH and the PDSCH, which is indicated by the "B" and the "C", via the received information on the PDCCH.

Figure 6:
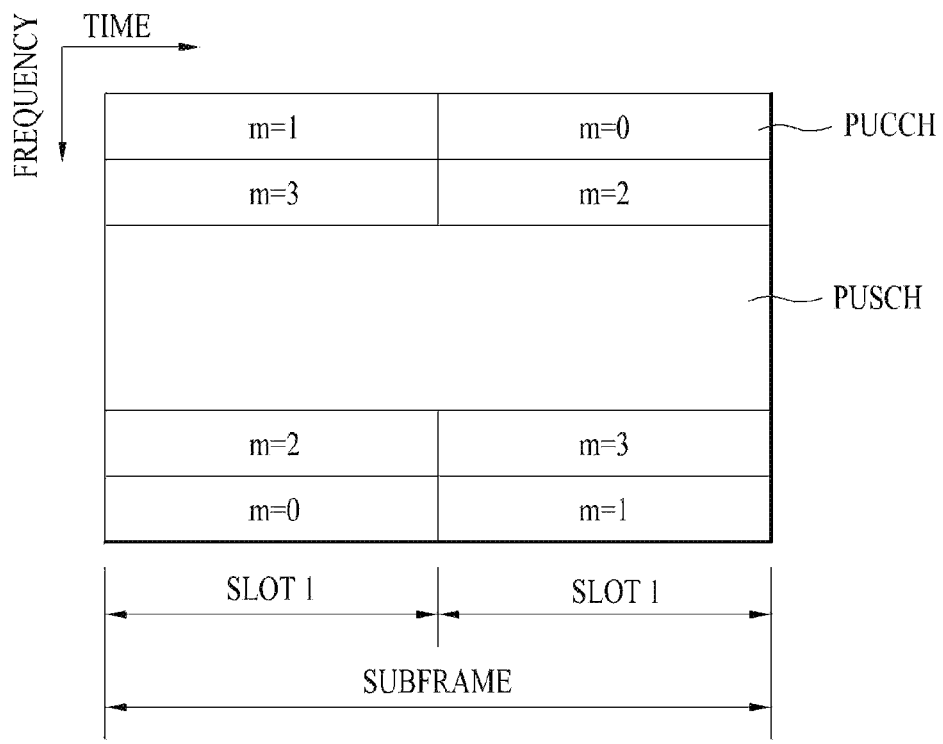
FIG. 6 is a diagram for a structure of an uplink radio frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
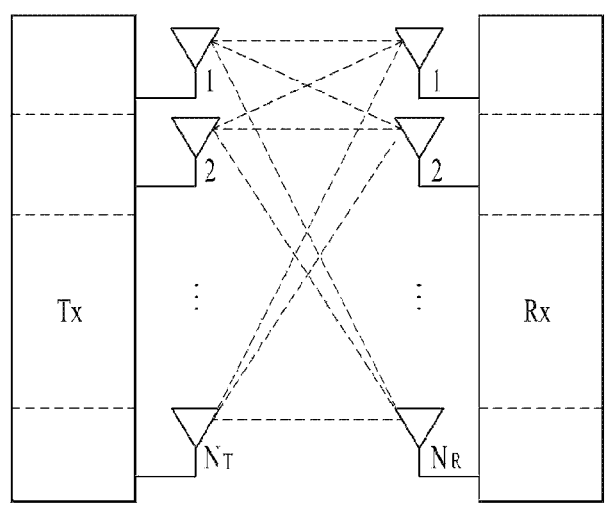
FIG. 7 is a diagram for a configuration of a multiple antenna communication system.

A block diagram of a general multi-antenna (MIMO) communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$ as shown in the following Equation 1. In this case, the $R_i$ is a smaller value of the $N_T$ and the $N_R$.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$s = [s_1, s_2, \ldots, s_{N_T}]^T \qquad \text{[Equation 2]}$$

Meanwhile, for each of the transmission informations $s_1$, $s_2, \ldots, s_{N_T}$, a transmit power may be differentiated according to the each of the transmission informations. In this case, if each of the transmit powers is represented as $P_1$, $P_2, \ldots, P_{N_T}$, transmit power-adjusted transmission information can be represented as a vector in the following Equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the NT number of transmission signal $x_1, x_2, \ldots, x_{N_T}$, which is practically transmitted, is configured in a manner of applying a weighted matrix W to the adjusted information vectors $\hat{S}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \quad \text{[Equation 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Equation 7 in the following.

$$\text{\# of streams} \leq \text{rank}(H) \leq \min(N_T, N_R) \quad \text{[Equation 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the UE in a manner of cooperating with each other to enhance a communication performance between the UE situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a UE may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the UE on a specific timing by one of the base stations performing the CoMP transmission method (Dynamic Point Selection (DPS)). On the other hand, according to the coordinated scheduling/beamforming method (CoMP-CS/CB), the UE may be able to instantaneously receive data from a single base station via a beamforming.

According to the joint processing (CoMP-JP) method in UL, each of the base stations may be able to simultaneously receive PUSCH signal from the UE (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, an example for a transmission mode of a downlink data channel is described. Currently, 3GPP LTE standard document, specifically, 3GPP TS 36. 213 document defines a transmission mode of a downlink data channel as shown in Table 1 in the following. The transmission mode is set to a UE via an upper layer signaling, i.e., RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |

TABLE 1-continued

| Transmission mode | DCI format | Transmission scheme of PDSCH corresponding to PDCCH |
|---|---|---|
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

Referring to Table 1, a transmission mode and a DCI format corresponding to the transmission mode, i.e. a transmission mode-based DCI format, defined in the current 3GPP LTE standard document are shown. In addition, DCI format 1A for a fall-back mode, which is capable of being applied irrespective of each transmission mode, is defined in the document. As an example of an operation of a transmission mode, referring to Table 1, if a UE performs a blind decoding on a PDCCH and then detects DCI format 1B, the UE decodes PDSCH on the assumption that the PDSCH has been transmitted with a closed-loop spatial multiplexing scheme using a single transmission layer.

In Table 1, a transmission mode 10 indicates a downlink data channel transmission mode of the aforementioned CoMP transmission method. For instance, if a UE performs a blind decoding on a PDCCH and then detects DCI format 2D, the UE decodes a PDSCH on the assumption that the PDSCH has been transmitted with a multi-layer transmission scheme based on antenna port 7 to 14, i.e., a DM-RS. Alternatively, the UE decodes the PDSCH on the assumption that the PDSCH has been transmitted with a single antenna transmission scheme based on DM-RS antenna port 7 or 8.

On the contrary, if the UE performs blind decoding on a PDCCH and then detects DCI format 1A, a transmission mode varies according to whether a corresponding subframe corresponds to an MBSFN subframe. For instance, if the corresponding subframe corresponds to a non-MBSFN subframe, the UE decodes PDSCH on the assumption that the PDSCH has been transmitted with a single antenna transmission scheme based on a CRS of an antenna port 0 or a CRS-based transmit diversity scheme. And, if the corresponding subframe corresponds to an MBSFN subframe, the UE decodes the PDSCH on the assumption that the PDSCH has been transmitted with a single antenna transmission based on a DM-RS of an antenna port 7.

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific UE (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a UE. This sort of reference signal is called a CSI-RS (channel state information-RS).

Figure 8:
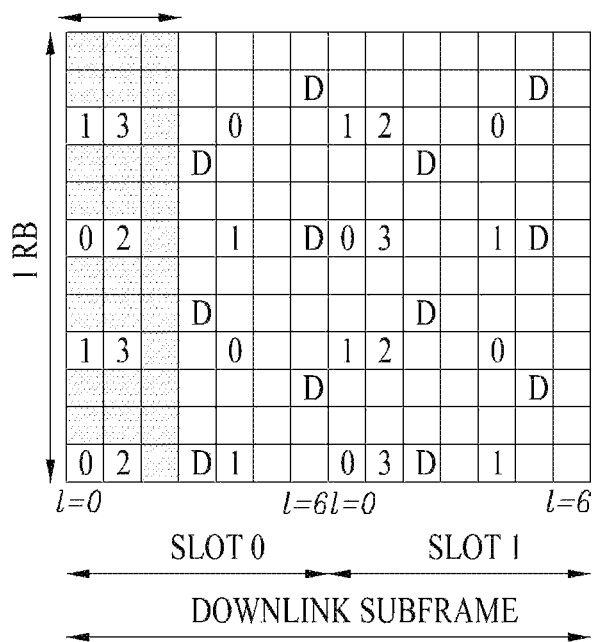
FIG. 8 and FIG. 9 are diagrams of a structure of a reference signal in LTE system supportive of downlink transmission using 4 antennas.
Figure 9:
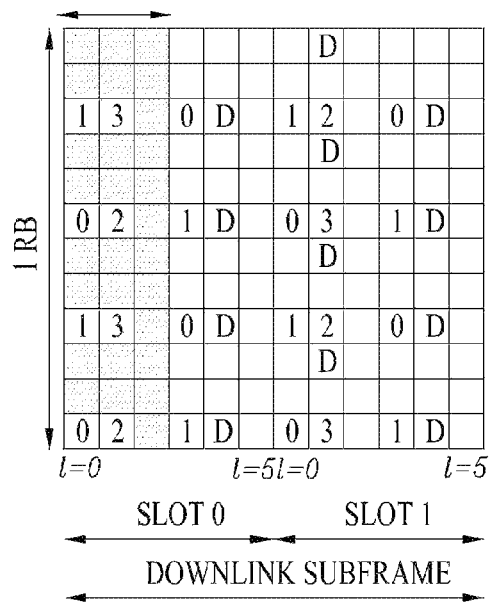

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a UE via the control information region as well as the data information region.

And, 'D' written on the grid may mean a downlink DM-RS (demodulation RS), which is a user-specific RS. The DM-RS supports a single antenna port transmission via the data region, i.e., the PDSCH. The UE is signaled whether the DM-RS, which is the UE-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
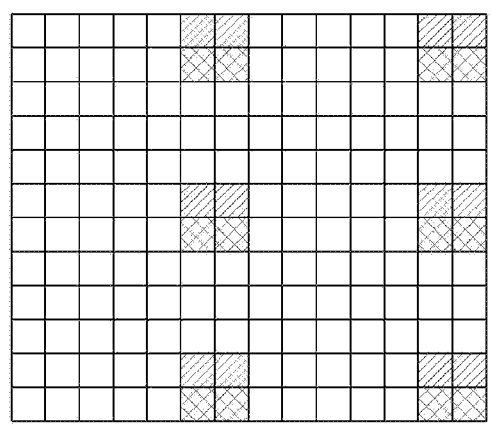
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 resource configurations different from each other to reduce inter-cell interference (ICI) in a multicell environment.

CSI-RS (resource) configuration varies according to the number of antenna ports. A CSI-RS is configured to be transmitted by different (resource) configurations between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. [Table 2] and [Table 3] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | $(k', l')$ | $n_s \bmod 2$ | $(k', l')$ | $n_s \bmod 2$ | $(k', l')$ | $n_s \bmod 2$ |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | $(k', l')$ | $n_s \bmod 2$ | $(k', l')$ | $n_s \bmod 2$ | $(k', l')$ | $n_s \bmod 2$ |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |

TABLE 3-continued

| | | Number of CSI reference signals configured | | | | | |
|---|---|---|---|---|---|---|---|
| | | 1 or 2 | | 4 | | 8 | |
| | CSI reference signal configuration | $(k', l')$ | $n_s \bmod 2$ | $(k', l')$ | $n_s \bmod 2$ | $(k', l')$ | $n_s \bmod 2$ |
| only | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
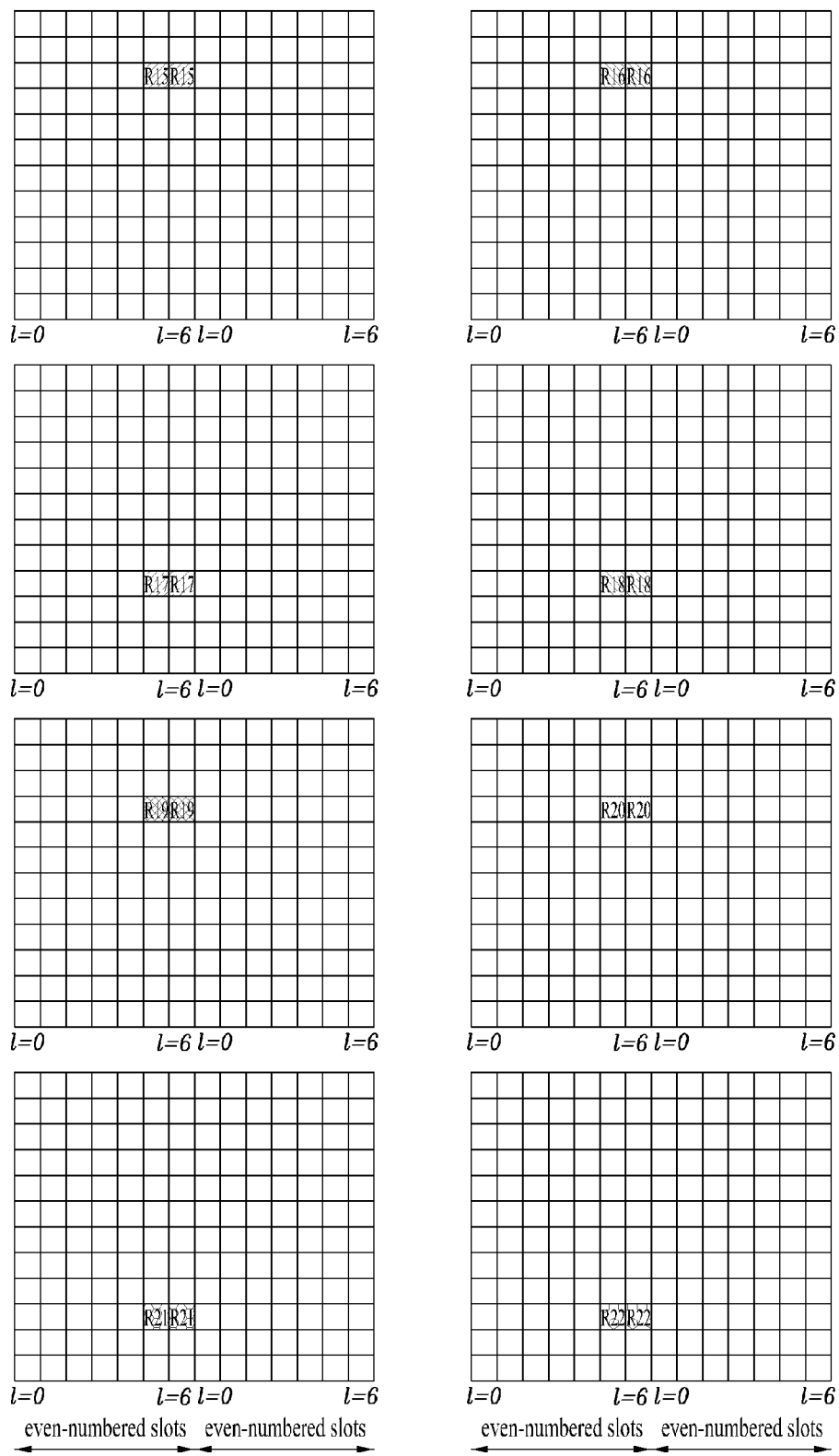
FIG. 11 is a diagram for an example of a CSI-RS configuration #0 in case of a normal CP among downlink CSI-RS configurations defined by a current 3GPP standard document.

In [Table 2] and [Table 3], (k',l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Meanwhile, information about a Zero Power (ZP) CSI-RS is configured by RRC layer signaling. Particularly, a ZP CSI-RS resource configuration includes zeroTxPowerSubframeConfig and a 16-bit bitmap, zeroTxPowerResourceConfigList. zeroTxPowerSubframeConfig indicates the CS-RS transmission periodicity and subframe offset of a ZP CSI-RS by $I_{CSI-RS}$ illustrated in [Table 3]. zeroTxPowerResourceConfigList indicates a ZP CSI-RS configuration. The elements of this bitmap indicate the respective configurations written in the columns for four CSI-RS antenna ports in [Table 1] or [Table 2]. A typical CSI-RS other than a ZP CSI-RS is referred to as a non-zero power (NZP) CSI-RS.

Meanwhile, when the above-described CoMP scheme is applied, a plurality of CSI-RS configurations may be configured for the UE through RRC layer signaling. Each CSI-RS configuration is defined as shown in Table 5. As can be appreciated with reference to Table 5, each CSI-RS configuration includes information about a CRS with which quasi co-location (QCL) can be assumed.

TABLE 5

CSI-RS-ConfigNZP information elements

```
-- ASN1START
CSI-RS-ConfigNZP-r11 ::=        SEQUENCE {
    csi-RS-ConfigNZPId-r11          CSI-RS-ConfigNZPId-r11,
    antennaPortsCount-r11           ENUMERATED {an1, an2, an4, an8},
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED {n1, n2, n4, spare1},
        mbsfn-SubframeConfigList-r11    CHOICE {
            release                         NULL,
            setup                           SEQUENCE {
                subframeConfigList              MBSFN-SubframeConfigList
            }
        }
```

TABLE 5-continued

CSI-RS-ConfigNZP information elements

```
        }                                   OPTIONAL   -- Need ON
    }                                       OPTIONAL,  -- Need OR
    ...
}
-- ASN1STOP
```

Meanwhile, a PDSCH RE mapping and quasi co-location indicator (PQI) field has been defined in DCI format 2D in a recent 3GPP LTE-A standard for transmission mode 10, which is PDSCH transmission of the CoMP scheme. Specifically, the PQI field is defined by 2 bits and indicates a total of four states as shown in [Table 6] below. Information indicated by each state is a parameter set for receiving a PDSCH of the CoMP scheme and detailed values thereof are pre-signaled by higher layers. That is, for [Table 6], a total of four parameter sets may be semi-statically signaled through an RRC layer signal and the PQI field of DCI format 2D dynamically indicates one of the four parameter sets.

TABLE 6

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Information included in each parameter set includes at least one of number of CRS antenna ports (crs-PortsCount), a CRS frequency shift (crs-FreqShift), MBSFN subframe configuration (mbsfn-SubframeConfigList), ZP CSI-RS configuration (csi-RS-ConfigZPId), a PDSCH start symbol (pdsch-Start), and QCL information of an NZP CSI-RS.

In the following, QCL (Quasi Co-Location) between antenna ports is explained.

QCL between antenna ports indicates that all or a part of large-scale properties of a signal (or a radio channel corresponding to a corresponding antenna port) received by a UE from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a UE cannot assume that the large-scale properties are identical to each other between antenna ports not in the QCL, i.e., NQCL (Non Quasi co-located) antenna ports. In this case, the UE should independently perform a tracking procedure to obtain frequency offset, timing offset and the like according to an antenna port.

On the contrary, the UE can perform following operations between antenna ports in QCL.

1) The UE can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the UE can apply identical synchronization to a different antenna port as well.

3) The UE can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the UE performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the UE performs a channel estimation via the DM-RS antenna port, the UE can enhance reception capability of the DM-RS based downlink data channel in a manner of applying large-scale properties of a radio channel estimated from a CRS antenna port of the UE as it is.

Similarly, if a DM-RS antenna port used for demodulating a downlink data channel and a CSI-RS antenna port of a serving cell are in QCL, when the UE perform a channel estimation via the DM-RS antenna port, the UE can enhance reception capability of the DM-RS based downlink data channel in a manner of applying large-scale properties of a radio channel estimated from a CSI-RS antenna port of the serving cell as it is.

Meanwhile, when the eNB transmits a DL signal in transmission mode 10 of the CoMP scheme in an LTE system, the eNB may be defined to configure the UE with one of QCL type A and QCL type B through higher layer signaling.

In QCL type A, the UE assumes that antenna ports of a CRS, a CSI-RS, and a DM-RS are QCL with respect to large-scale properties except for average gain. QCL type A means that physical channels and signals are transmitted in the same node (point).

In QCL type B, the UE assumes that antenna ports of a DM-RS and a specifically indicated CSI-RS are QCL with respect to large-scale properties except for average gain. Particularly, QCL type B is defined to configure up to four QCL modes for each UE by a higher layer message so as to perform CoMP transmission such as DPS or JT and a QCL mode to be used for DL signal reception is dynamically indicated to the UE by DCI. This information is defined by qcl-CSI-RS-ConfigNZPId among parameter sets of the PQI field.

DPS transmission in the case of QCL type B will now be described in more detail.

First, it is assumed that node #1 including $N_1$ antenna ports transmits CSI-RS resource #1 and node #2 including $N_2$ antenna ports transmits CSI-RS resource #2. In this case, CSI-RS resource #1 is included in parameter set #1 of the PQI and CSI-RS resource #2 is included in parameter set #2 of the PQI. Furthermore, the eNB signals parameter set #1 and parameter set #2 to a UE located within the common coverage of node #1 and node #2 through higher layer signaling.

Next, the eNB may perform DPS by configuring, using DCI, parameter set #1 during data (i.e. PDSCH) transmission to the UE through node #1 and parameter set #2 during data transmission to the UE through node #2. If parameter set #1 of the PQI is configured for the UE through the DCI, the UE may assume that CSI-RS resource #1 is QCL with a DM-RS and, if parameter set #2 of the PQI is configured for the UE, the UE may assume that CSI-RS resource #2 is QCL with the DM-RS.

<Semi-Static CoMP Mode>

The present invention proposes a communication scheme in which a UE of a multi-cell based wireless communication system receives information about a CRS or tracking RS information of a specific neighboring cell rather than a serving cell thereof through a higher layer signal which is a semi-static signal such as an additional RRC layer signal, performs CSI feedback through the CRS or TRS of the neighboring cell, and receives a PDSCH based on a DM-RS. That is, the present invention proposes a semi-static CoMP mode.

In this case, the information about the CRS or TRS of the neighboring cell transmitted through higher layer signaling may be expressed by the PQI parameter set as shown in [Table 6]. The UE may perform CSI feedback based on CRS information included in a parameter set.

Particularly, the parameter set may be defined to include a CRS scrambling seed. In more detail, the PQI parameter set defines only the number of CRS antenna ports (crs-PortsCount), a CRS frequency shift (crs-FreqShift), and MBSFN subframe configuration (mbsfn-SubframeConfig-List), for CRS rate matching of a CoMP mode. However, according to the present invention, the PQI parameter set desirably includes the CRS scrambling seed, for example, a physical cell ID (PCI) of a neighboring cell. In this case, since the frequency shift is calculated based on the PCI, the frequency shift may be excluded from the existing parameter set.

Meanwhile, the UE may consider a semi-static CoMP mode request method, which corresponds to the communication scheme, using UE capability signaling according to the present invention. First, UE capability signaling will be described in brief.

In an LTE system, a carrier aggregation (CA) scheme has typically been introduced for performance improvement. UEs need to support the CA scheme and may be variously classified into UEs having a high-level capability and UEs having a low-level capability according to a CA support degree. In order to inform an eNB of the capability of a UE, various fields including a UE category field are defined in a UE-EUTRA-Capability information element in the 3GPP standard document. Especially, the number of CSI processes for each frequency band or carrier supported by the UE is defined to include information shown in [Table 7] below.

TABLE 7

```
...
BandParameters-v1130 ::= SEQUENCE {
    supportedCSI-Proc-r11    ENUMERATED {n1, n3, n4}
}
...
```

Meanwhile, in the 3GPP standard document, the concept of a CSI process including a combination of one NZP CSI-RS resource for signal measurement and one CSI-IM resource for interference measurement has been introduced for CSI feedback of the UE. The UE may include the maximum supportable number (P) of CSI processes in UE capability signaling and inform the eNB of P. The UE may transmit, to the eNB, one of P=1, P=3, and P=4 which are expressed as n1, n3, and n4, respectively, in [Table 7].

Transmission of P=1 to the eNB as UE capability signaling indicates that the UE can process only a single CSI process and may mean that DPS operation is impossible even in transmission mode 10 and an effect of accuracy improvement in interference measurement through use of CSI-IM can mainly be expected. Transmission of P=3 or P=4 as UE capability signaling indicates that the UE can configure multiple CSI processes and the UE can perform DPS operation by receiving a CSI process information element from a higher layer and then performing CSI feedback for each CSI process.

The present invention proposes that P be set to 0 or a preset value in the case in which the UE, which desires to implement a communication scheme of performing CSI feedback through a CRS or a TRS of a neighboring cell and receiving a DM-RS based PDSCH, transmits capability signaling. That is, it is defined that the number of CSI processes for each frequency band or carrier supported by the UE includes information shown below in [Table 8]. It may be appreciated that [Table 8] further includes a new code point n0.

TABLE 8

```
...
BandParameters-v1130 ::= SEQUENCE {
    supportedCSI-Proc-r11    ENUMERATED {n0, n1, n3, n4}
}
...
```

Transmission of P=0 as capability signaling may be interpreted as indicating that the UE cannot receive configuration of a CSI process or the UE does not desire to receive configuration of the CSI process even though the eNB is in a transmission mode, such as transmission mode 10, in which the eNB can configured multiple CSI processes. That is, although the UE may be configured as transmission mode 10 or only transmission mode 10 can always be configured in a corresponding specific band can always be configured as transmission mode 10, transmission of P=0 may mean that the CSI process cannot be configured and thus an NZP CSI-RS resource cannot be configured. That is, transmission of P=0 as UE capability signaling is a special case of transmission mode 10. Herein, no NZP CSI-RS resource configuration may mean that QCL related information is disregarded.

In this case, when the UE performs CSI feedback through a CRS or a TRS of a neighboring cell and receives a DM-RS based PDSCH, the CRS or TRS of the neighboring cell may always be designated as another RS that can make a QCL assumption with a DM-RS. Accordingly, other information regarding QCL is unnecessary and thus is desirably disregarded. Alternatively, in the case in which the UE transmits P=0, QCL related information may be defined to be deleted from specific RRC signaling in the standard document.

Therefore, as RRC signaling information related to transmission mode 10, information about a QCL type of the UE, i.e., information as to whether the UE operates as QCL type A or QCL type B may also be disregarded when the UE transmits P=0. Alternatively, in the case of the UE that has transmitted P=0, the UE may be regulated as not having information about a QCL type of the UE or as operating always as QCL type A. If the UE that has transmitted P=0 is determined always to be QCL type A, this may be reinterpreted as indicating that a QCL assumption can be made between a DM-RS and a specific CRS or TRS of a neighboring cell for CSI feedback in the case in which the DM-RS based PDSCH is received.

In addition, an example of "only transmission mode 10 can always be configured in a corresponding specific band" is the case in which band A and band B are included in a specific band combination and P=0 is configured for band A during capability information signaling. In this case, only transmission mode 10 can always be configured for band A and a CSI process in band A cannot be configured. Thus, when P=0 is signaled for band A, a CSI process configuration in band A is prevented.

The UE that transmits P=0, i.e. the UE that desires to perform CSI feedback through a CRS or a TRS from a neighboring cell and receive a DM-RS based PDSCH, may be defined not to receive a CSI-IM configuration as well. In this case, if the CSI-IM configuration is transmitted to the UE, the UE may disregard this or may regard this as an error.

Obviously, preference of the communication scheme of the present invention may be signaled using a scheme of not transmitting a supportedCSI-Proc-r11 field for a specific band, instead of signaling the communication scheme of the present invention by adding n0 as shown in [Table 8].

Transmission of P=0 as capability signaling indicates that the UE cannot receive only a CSI process configuration. Therefore, at least one of other configurations of transmission mode 10, for example, a PQI field, ZP CSI-RS configurations, a CSI-IM configuration, and an EPDCCH related configuration may still be performed. In this case, four parameter sets for the PQI field may be transmitted by higher layers and a parameter set to be applied as CRS information for CSI feedback may be indicated to the UE through RRC signaling. Alternatively, a specific parameter set, for example, a parameter set having a minimum index, may be applied as the CRS information for CSI feedback. Obviously, information other than the CRS information in the signaled parameter set or in the specific parameter set may be disregarded. However, among information included in the parameter set, information about a PDSCH start symbol, information about PDSCH rate matching for a corresponding CRS, or information about PDSCH rate matching for a ZP CSI-RS may not be disregarded and may be applied.

In CSI feedback for the communication scheme of the present invention, it is unusual that an RI value cannot be greater than the number (Ntx) of antenna ports of a CRS or a TRS for CSI feedback. That is, in transmission mode 10, since the UE performs CSI feedback based on the CRS or the TRS although a DM-RS based PDSCH of a maximum rank 8 can be scheduled, a rank greater than Ntx cannot be selected. If the UE has reported an RI greater than Ntx, the eNB may regard this as an error or even when an RI greater than Ntx is reported, an actually applied rank may be regulated as Ntx.

In addition, a 3-bit DM-RS configuration field in a DL grant for scheduling the DM-RS based PDSCH may indicate the number of layers. If the indicated number of layers is greater than Ntx, the UE may disregard this as an error or may transmit NACK for the DL grant.

When DCI format 2D for transmission mode 10 is used for the communication scheme according to the present invention, DCI format 2D may include up to two virtual cell IDs (VCIs) for generating a DM-RS sequence having one of 0 to 503 as a DM-RS scrambling seed value as in a conventional scheme. However, according to the communication scheme of the present invention, since the DM-RS based PDSCH is received from a neighboring cell, i.e. since the UE does not intend to perform DPS operation of a CoMP mode, the DM-RS scrambling seed value may always be a physical cell ID (PCI) of a neighboring cell. In other words, the DM-RS scrambling seed value indicated by the DL grant is disregarded and the DM-RS sequence is always generated by the PCI of the neighboring cell.

Meanwhile, regarding reception of the DM-RS based PDSCH, the DL grant for the PDSCH may be received even through an EPDCCH. The EPDCCH refers to a control channel transmitted through an existing PDSCH region and is demodulated based on a DM-RS. Especially, in the 3GPP standard document, multiple EPDCCH search space sets are defined to be configured in relation to reception of the EPDCCH in a CoMP mode. In this case, a different QCL type for each EPDCCH search space set may be configured. However, for the communication scheme of the present invention, information for defining a QCL type for each EPDCCH search space set may not be applied or only QCL type A may always be applied to all EPDCCH search space sets. Then, a DM-RS for demodulating the EPDCCH may be preregulated to make a QCL assumption with the CRS or TRS of the neighboring cell.

While only CRS based feedback has been described because an NZP CSI-RS resource for CSI feedback is not configured, a serving cell may estimate a UL channel based on UL SRS transmission to the neighboring cell of the UE and estimate an RI and a PMI of a DL channel using channel symmetry based on the estimated UL channel. To this end, the neighboring cell needs to transmit information about the estimated UL channel based on an SRS to the serving cell.

Meanwhile, for convenience of description, while the semi-static CoMP mode, which is the communication scheme of the present invention, has been described as a special case of transmission mode 10, it is apparent that an independent transmission mode may be designated as the semi-static CoMP mode.

The communication scheme of the present invention has advantages of separately configuring a CSI-RS resource for CSI feedback for a channel with a neighboring cell and performing DM-RS based PDSCH transmission while preventing waste of resources.

Figure 12:
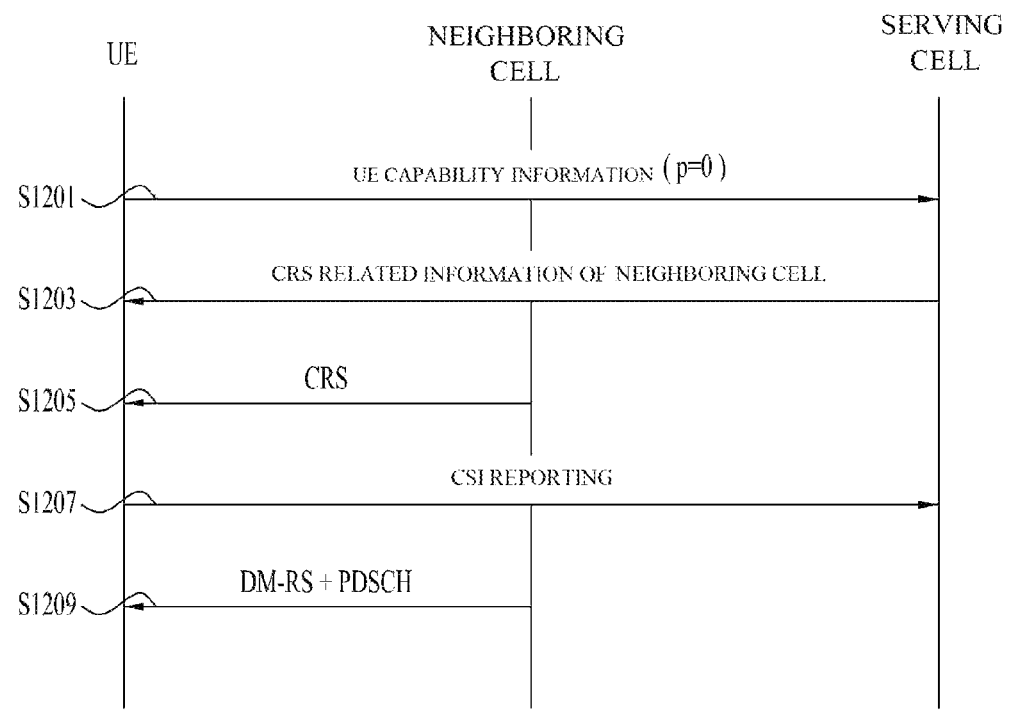
FIG. 12 is a signal flow illustrating a communication scheme according to an embodiment of the present invention.

FIG. 12 is a signal flow illustrating a communication scheme according to an embodiment of the present invention.

Referring to FIG. 12, in step 1201, a UE signals UE capability information for a specific band or a specific carrier to a serving cell. Especially, in the present invention, the UE sets the number of CSI processes supported in the band or the carrier, i.e., P, to 0 in signaling the UE capability information.

Upon receiving the UE capability information, the serving cell recognizes that the UE desires to operate in a semi-static CoMP mode of the present invention and transmits CRS related information of a neighboring cell to the UE in step 1203. The CRS related information is desirably transmitted through RRC signaling which is higher layer signaling, particularly, in a parameter set for a PQI field. More desirably, the parameter set may include a PCI of the neighboring cell.

Next, the UE receives a CRS from the neighboring cell, measures CSI based on the CRS, and reports the CSI to the serving cell in steps 1205 and 1207.

In addition, the UE may receive a PDSCH based on a DM-RS from the neighboring cell in step 1209. Characteristically, the DM-RS for receiving the PDSCH may be a DM-RS that can make a QCL assumption with the CRS received in step 1205 and the DM-RS may be defined by the parameter set.

Figure 13:
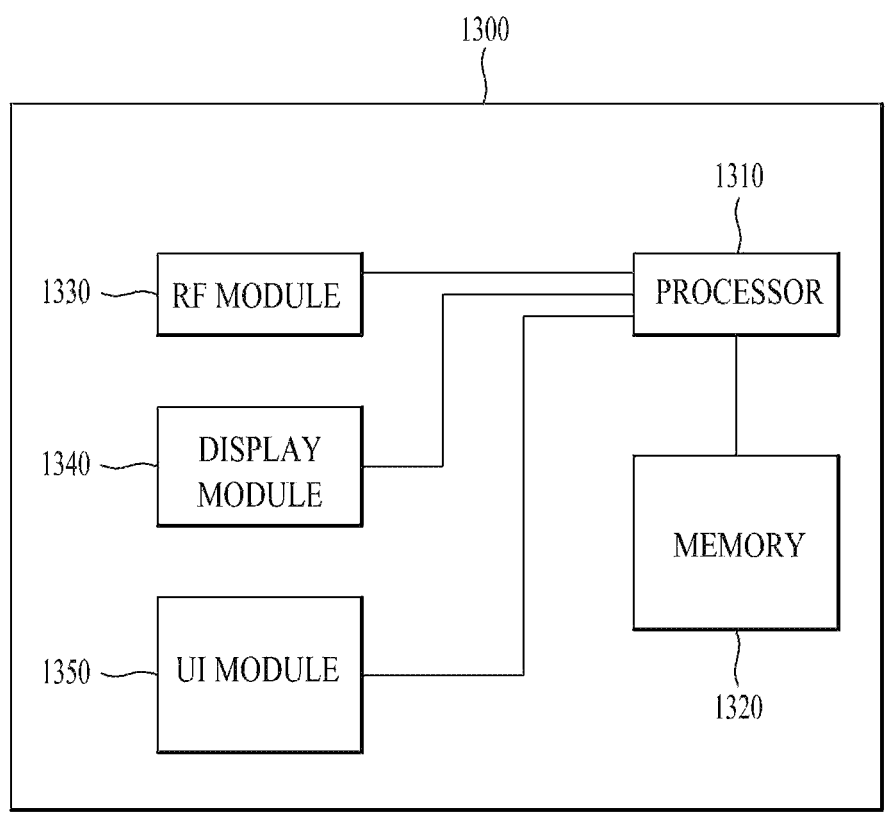
FIG. 13 is a block diagram for an example of a communication device according to one embodiment of the present invention.

FIG. 13 is a block diagram for an example of a communication device according to one embodiment of the present invention.

Referring to FIG. 13, a communication device 1300 may include a processor 1310, a memory 1320, an RF module 1330, a display module 1340, and a user interface module 1350.

Since the communication device 1300 is depicted for clarity of description, prescribed module(s) may be omitted in part. The communication device 1300 may further include necessary module(s). And, a prescribed module of the communication device 1300 may be divided into subdivided modules. A processor 1310 is configured to perform an operation according to the embodiments of the present invention illustrated with reference to drawings. In particular, the detailed operation of the processor 1310 may refer to the former contents described with reference to FIG. 1 to FIG. 12.

The memory 1320 is connected with the processor 1310 and stores an operating system, applications, program codes, data, and the like. The RF module 1330 is connected with the processor 1310 and then performs a function of converting a baseband signal to a radio signal or a function of converting a radio signal to a baseband signal. To this end, the RF module 1330 performs an analog conversion, amplification, a filtering, and a frequency up conversion, or performs processes inverse to the former processes. The display module 1340 is connected with the processor 1310 and displays various kinds of informations. And, the display module 1340 can be implemented using such a well-known component as an LCD (liquid crystal display), an LED (light emitting diode), an OLED (organic light emitting diode) display and the like, by which the present invention may be non-limited. The user interface module 1350 is connected with the processor 1310 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the method for transmitting and receiving a signal by a UE in a multi-cell based wireless communication system and the apparatus therefor have been described in the context of a 3GPP LTE system, the present invention is also applicable to various wireless communication systems.

The invention claimed is:

1. A method for transmitting and receiving a signal by a user equipment in a multi-cell based wireless communication system, the method comprising:

requesting a coordinated multi point (CoMP) transmission by transmitting, to a serving cell, capability information indicating a number of supportable channel status information (CSI) processes set to 0, wherein the number of supportable CSI processes set to 0 indicates that the user equipment wishes to receive a data channel from a neighboring cell;

receiving information about the neighboring cell through a higher layer from the serving cell as a response to the capability information;

receiving a cell-specific reference signal from the neighboring cell;

reporting CSI estimated based on the cell-specific reference signal to the serving cell, wherein the CSI reported to the serving cell is transferred to the neighboring cell; and receiving a user equipment specific reference signal and the data channel based on the CSI from the neighboring cell, wherein a maximum value of a rank for the data channel is limited to a number of antenna ports of the cell-specific reference signal, and wherein the capability information indicating the number of supportable CSI processes is supportedCSI-Proc-r11 parameter.

2. The method according to claim 1, wherein the receiving the user equipment specific reference signal and the data channel comprises:
   detecting the user equipment specific reference signal; and
   decoding the data channel using information estimated by the user equipment specific reference signal.

3. The method according to claim 2, where the information about the neighboring cell includes cell identifier information of the neighboring cell.

4. The method according to claim 3, wherein the user equipment specific reference signal is detected using the cell identifier information of the neighboring cell.

5. The method according to claim 2, wherein the user equipment specific reference signal is a user equipment specific reference signal assumed to have the same large-scale properties as the cell specific reference signal in the information about the neighboring cell.

6. The method according to claim 5, wherein the large-scale properties include at least one of Doppler spread, Doppler shift, average delay, and delay spread.

7. The method according to claim 1, wherein the information about the neighboring cell includes information about a cell specific reference signal of the neighboring cell.

8. A user equipment in a multi-cell based wireless communication system, the user equipment comprising:
   a radio frequency (RF) module that transmits and receives a signal to and from a network through multiple cells; and
   a processor that processes the signal,
   wherein the processor controls the RF module to:
   request a coordinated multi point (CoMP) transmission by transmitting, to a serving cell, capability information indicating a number of supportable channel status information (CSI) processes set to 0, wherein the number of supportable CSI processes set to 0 indicates that the user equipment wishes to receive a data channel from a neighboring cell,
   receive information about the neighboring cell through a higher layer signal from the serving cell as a response to the capability information,
   receive a cell-specific reference signal from the neighboring cell,
   report CSI estimated based on the cell-specific reference signal to the serving cell, wherein the CSI reported to the serving cell is transferred to the neighboring cell, and
   receive a user equipment specific reference signal and the data channel based on the CSI from the neighboring cell,
   wherein a maximum value of a rank for the data channel is limited to a number of antenna ports of the cell-specific reference signal, and
   wherein the capability information indicating the number of supportable CSI processes is supportedCSI-Proc-r11 parameter.

9. The user equipment according to claim 8, wherein the processor detects the user equipment specific reference signal and decodes the data channel using information estimated by the user equipment specific reference signal.

10. The user equipment according to claim 9, where the information about the neighboring cell includes cell identifier information of the neighboring cell.

11. The user equipment according to claim 10, wherein the user equipment specific reference signal is detected using the cell identifier information of the neighboring cell.

12. The user equipment according to claim 9, wherein the user equipment specific reference signal is a user equipment specific reference signal assumed to have the same large-scale properties as the cell specific reference signal in the information about the neighboring cell.

13. The user equipment according to claim 12, wherein the large-scale properties include at least one of Doppler spread, Doppler shift, average delay, and delay spread.

14. The user equipment according to claim 8, wherein the information about the neighboring cell includes information about a cell specific reference signal of the neighboring cell.

* * * * *